(12) United States Patent
Tanna et al.

(10) Patent No.: US 11,606,703 B2
(45) Date of Patent: Mar. 14, 2023

(54) DISTRIBUTED MULTI-HNG SON

(71) Applicant: Parallel Wireless, Inc., Nashua, NH (US)

(72) Inventors: Poojan Tanna, Nashua, NH (US); Harish Kumar Lohar, Nashua, NH (US); Vikram Karandikar, Nashua, NH (US); Mohit Chugh, Nashua, NH (US); Ravi Nathwani, Pune (IN); Apeksha Jain, Nashua, NH (US); Prateek Batra, Nashua, NH (US); Michael C. Silva, East Sandwich, MA (US); Bryan Panner, Windham, NH (US); Ameya Gangamwar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/528,608

(22) Filed: Jul. 31, 2019

(65) Prior Publication Data

US 2020/0045565 A1 Feb. 6, 2020

Related U.S. Application Data

(60) Provisional application No. 62/712,954, filed on Jul. 31, 2018.

(51) Int. Cl.
*H04W 24/02* (2009.01)
*H04W 24/10* (2009.01)
(Continued)

(52) U.S. Cl.
CPC .......... *H04W 24/02* (2013.01); *H04W 24/10* (2013.01); *H04W 52/225* (2013.01); *H04W 68/02* (2013.01); *H04W 84/18* (2013.01)

(58) Field of Classification Search
None
See application file for complete search history.

(56) References Cited

U.S. PATENT DOCUMENTS 3,671,020 A 6/1972 Krup et al.
9,588,815 B1 3/2017 Mistry et al.
(Continued)

FOREIGN PATENT DOCUMENTS

WO 2017031384 A1 2/2017

OTHER PUBLICATIONS

Jack Jia, "Building Unified PaaS Architecture for Agile Development," Apr. 7, 2017, Huawei Technologies Co., Ltd.
(Continued)

*Primary Examiner* — Hong Shao
(74) *Attorney, Agent, or Firm* — Michael Y. Saji; David W. Rouille

(57) ABSTRACT

Systems, methods and computer software are disclosed for providing a multi-Het Net Gateway (HNG) distributed Self Organizing Network (dSON) for a wireless network. The dSON ascertains information from at least one of User Equipment (UE) reports and neighbor detection for a mobile EnodeB attached to an HNG. A configuration is adjusted for the mobile eNodeB based on location and a state of neighbors obtained from the UE report and neighbor detection. The mobile eNodeB configuration includes at least one of Physical Cell Identification (PCI) allocation, Tracking Area Code (TAC) allocation, reference Transmit (Tx) power management, and Automatic Neighbor Relations (ANR) table.

19 Claims, 19 Drawing Sheets

(51) Int. Cl.
  *H04W 52/22* (2009.01)
  *H04W 68/02* (2009.01)
  *H04W 84/18* (2009.01)

(56) References Cited

U.S. PATENT DOCUMENTS

| | | |
|---|---|---|
| 2004/0198408 A1 | 10/2004 | Dillon et al. |
| 2013/0083744 A1 | 4/2013 | Peng et al. |
| 2015/0146519 A1 | 5/2015 | Zakrzewski |
| 2015/0372874 A1 | 12/2015 | Nuss et al. |
| 2016/0127169 A1 | 5/2016 | Rosa de Sousa Teixeira et al. |
| 2016/0128020 A1* | 5/2016 | Agarwal ............... H04W 8/02 370/328 |
| 2016/0156503 A1 | 6/2016 | Rosa de Sousa Teixeira et al. |
| 2016/0295357 A1 | 10/2016 | Grayson et al. |
| 2016/0295521 A1* | 10/2016 | Grayson ............... H04W 68/02 |
| 2017/0055186 A1* | 2/2017 | Donepudi ............ H04W 4/026 |
| 2017/0187785 A1 | 6/2017 | Johnson et al. |
| 2018/0006935 A1 | 1/2018 | Mutnuru et al. |
| 2018/0091420 A1 | 3/2018 | Drake et al. |
| 2018/0176306 A1 | 6/2018 | Kahn |
| 2018/0249426 A1 | 8/2018 | Mrozinski |
| 2018/0376338 A1 | 12/2018 | Ashraf |
| 2021/0051745 A1 | 2/2021 | Supanekar |
| 2021/0076259 A1 | 3/2021 | Mishra et al. |

OTHER PUBLICATIONS

"Enterprise Service Bus," Wikipedia, the free encyclopedia. Retrieved Jul. 30, 2018.
Jorg Niemoller, Ioannis Fikouras, Frans De Room, Lucas Klostermann, Ulf Stringer, Ulf Dlsson, "Ericsson Composition Engine—Next-generation IN," Jan. 2009, Ericsson Review (English Edition).
Falko Menge, "Enterprise Service Bus," Free and Open Source Software Conference 2007.
"Etisalat Transforms BBS With Ericsson," Dec. 18, 2013, Light Reading, an Informa business, trading within KNect365 US, Inc.
Jeffery Vogel, Michael Stricklen, "How Loosely Coupled Architectures are Helping the Modernization of Legacy Software," Oct. 2, 2017, EYGM Limited (Formerly Bulger Partners).
"Loose Coupling," Wikipedia, the free encyclopedia, Retrieved Jul. 30, 2018.
Jurgen Kress, Berthold Maier, Hajo Normann, Danilo Schmeidel, Guido Schmutz, Bernd Trops, Clemens Utschig-Utschig, Torsten Winterberg, "Enterprise Service Bus," Jul. 2013, Oracle Technical Resources (Formerly Oracle Technology Network).
Richard Watson, "How to Architect and Design Cloud-Native Applications," Dec. 29, 2015, Gartner Research, ID G00296114, retrieved from https://www.gartner.com/en/documents/3181919.
"ICT Platform for Digital Communication Providers," Sep. 2, 2015, Ericsson and TIBCO Software, Inc.

* cited by examiner

DISTRIBUTED MULTI-HNG SON

CROSS-REFERENCE TO RELATED APPLICATIONS

This application claims priority under 35 U.S.C. § 119(e) to U.S. Provisional Pat. App. No. 62/712,954, filed Jul. 31, 2018, titled "MULTI-HNG DISTRIBUTED SON," which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, having attorney docket numbers PWS-71700US01, 71710US01, 71717US01, 71721US01, 71756US01, 71762US01, 71819US00, and 71820US01, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850U501); US20170272330A1 (PWS-71850US02); and Ser. No. 15/713,584 (PWS-71850US03). This application also incorporates by reference application attorney docket no. PWS-72562US01, titled "Service Bus for Telecom Infrastructure," filed on Jul. 31, 2019, as well as U.S. Provisional Patent Application No. 62/712,968 (PWS-72562US00).

BACKGROUND

Public safety (PS) deployment use cases are different from typical Long Term Evolution (LTE) deployment. In public safety use cases, an eNodeB is mobile and could appear in different locations within a territory. The impact on the following SON features should be considered: Physical Cell Identity (PCI) planning/allocation, PCI detection and resolution; Down Link (DL) Reference Tx Power management; Neighbor Management; Manual Neighbor Relation Table (NRT); X2 bases ANR; UE learned ANR through E-UTRAN Cell Global Identifier (ECGI) Resolution Procedure; Geo-location based Neighbor; Dynamic/Static eNodeB Configuration; and Tracking Area code (TAC) allocation.

SUMMARY

Systems, methods and computer readable medium for a multi-HetNet Gateway (HNG) distributed Self-Organizing Network (dSON) are described. In the Public Safety deployment architecture, eNodeB and backhaul modules are load balanced across multiple HNG servers. As a result, an eNodeB does not have any affinity to an HNG or an HNG site and may attach to any available HNG. This approach allows for distribution of HNGs across multiple sites, but it introduces a challenge of coordinating SON between eNodeB located on different HNGs as well as the need for dynamic configuration generation for eNodeB as they may change HNG while moving or when they get disconnected and reconnected.

In one embodiment, a method may be disclosed for providing a multi-Het Net Gateway (HNG) distributed Self Organizing Network (dSON) for a wireless network including at least one mobile eNodeB and a plurality of HNGs. The method includes ascertaining, by the dSON information from at least one of User Equipment (UE) reports and neighbor detection for a mobile eNodeB attached to an HNG and adjusting a configuration for the mobile eNodeB based on location and a state of neighbors obtained from the UE report and neighbor detection. The mobile eNodeB configuration includes at least one of Physical Cell Identification (PCI) allocation, Tracking Area Code (TAC) allocation, reference Transmit (Tx) power management, and Automatic Neighbor Relations (ANR) table.

In another embodiment, a system for providing a multi-Het Net Gateway (HNG) distributed Self Organizing Network (dSON) for a wireless network is presented. The system includes a plurality of HetNet Gateways (HNGs) and a mobile eNodeB in wireless communication with one of the plurality of HNGs. The dSON ascertains information from at least one of User Equipment (UE) reports and neighbor detection for the mobile EnodeB attached to an HNG and adjusts a configuration for the mobile eNodeB based on a location and a state of neighbors obtained from the UE report and neighbor detection. The mobile eNodeB configuration includes at least one of Physical Cell Identification (PCI) allocation, Tracking Area Code (TAC) allocation, reference Transmit (Tx) power management, and Automatic Neighbor Relations (ANR) table.

In another embodiment, a non-transitory computer-readable medium containing instructions for providing a multi-Het Net Gateway (HNG) distributed Self Organizing Network (dSON) for a wireless network is described which, when executed, cause a dSON to perform steps including ascertaining information from at least one of User Equipment (UE) reports and neighbor detection for a mobile eNodeB attached to an HNG and adjusting a configuration for the mobile eNodeB based on location and a state of neighbors obtained from the UE report and neighbor detection. The mobile eNodeB configuration includes at least one of Physical Cell Identification (PCI) allocation, Tracking Area Code (TAC) allocation, reference Transmit (Tx) power management, and Automatic Neighbor Relations (ANR) table.

DETAILED DESCRIPTION

Figure 1:
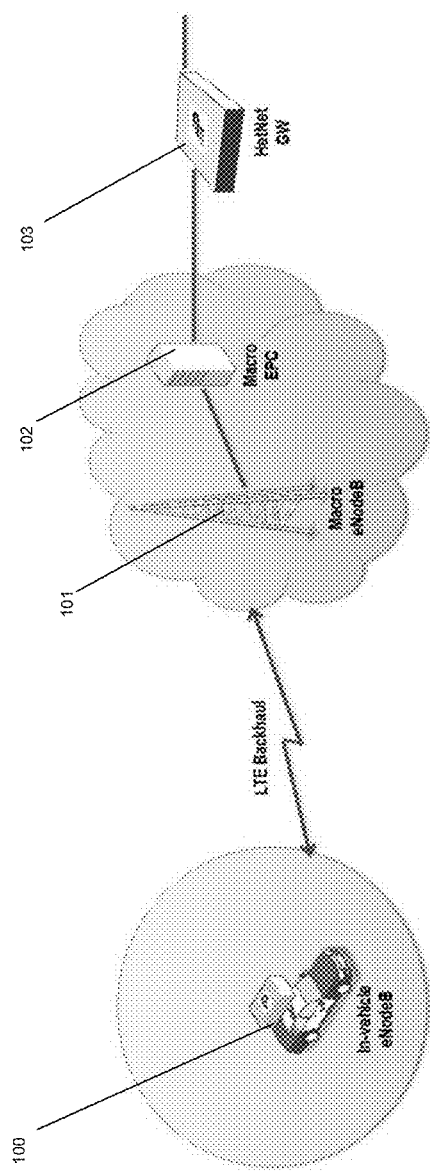
FIG. 1 is a system diagram showing components for providing a multi-HetNet Gateway (HNG) distributed Self Organizing Network (dSON), in accordance with some embodiments.

Distributed Self-Organizing Network (SON) is a critical function of the Public Safety solution. It simplifies pre-provisioning or pre-configuring of mobile CWS devices. It is desirable to have Distributed SON (dSON) among distributed mesh and LTE access nodes served by different HNGs. The customer may deploy multiple sites with each site having for example up to seven HNG clusters. The support for dSON coordination is required because mesh and LTE access nodes can connect to different HNGs but they can be next to each other as neighboring nodes so different HNGs need to have a distributed SON for supporting ANR and interference mitigation. If needed, eNodeB configuration is adjusted/generated based on the location and the state of surrounding neighbors.

As used herein, a HetNet Gateway (HNG) is a multipurpose gateway situated between one or more base stations and the cellular core network, used to coordinate both signaling and data between the base stations and the cellular core network. The HNG is configured to provide a connection to one or more core networks to the base station, hiding the complexity of the underlying core network or networks; likewise, the HNG is configured to provide a connection to one or more base stations from the core networks. The HNG does this by acting as a virtualizing proxy, presenting itself as a single base station to the core network and as a single core network to the base station, regardless of the number or type of base stations that are connected through it, thereby enabling any radio access technology (RAT), any G, 2G/3G/4G/5G/Wi-Fi/etc. connectivity to the core and also enabling a variety of core infrastructures to be used with the base station, such as 2G+3G, 4G, 4G+IMS, 5G NSA, 5G SA, etc. The HNG is able to facilitate SON services as described herein for base stations that are connected through it. The HNG is able to interoperate with other HNGs to effectively and efficiently perform load balancing for gateway and proxy services as well. The HNG is further described throughout the present disclosure, in the above incorporations by reference, and in particular with reference to FIG. 7 and coordinating server 700.

As used herein, a CWS is a base station that is configured for use with the HNG. The CWS can be a 4G eNodeB, a 3G nodeB, a 2G BTS, a 5G gNodeB, a Wi-Fi access point coupled with a security gateway, or a multi-RAT node, for example, 2G+4G, 2G+3G, 3G+4G, 4G+5G, 4G+Wi-Fi, etc. The CWS typically is configured with wireless backhaul via a cellular modem that connects to another cell tower, such as a 4G or 5G macro cell tower, to provide wireless backhaul for both signaling and data. Various configurations of CWS are contemplated. For example, remote radio heads, central unit/distributed unit (CU/DU) splits, 5G NR, Wi-Fi or Wi-Fi mesh backhaul instead of or in conjunction with cellular backhaul are all contemplated. The HNG coordinates the CWS to provide the desired level and type of access network to provide coverage to UEs. Wherever "eNodeB" is used in the present disclosure, it is understood that the inventors have contemplated an implementation with a CWS providing one or more RATs as well as and other than 4G, including 2G, 3G, 5G, and Wi-Fi. The principles (e.g., PCI, ECGI, X2, etc.) that are described herein with regards to 4G have equivalents in other RATs as well that have been contemplated by the inventors, particularly since the combination CWS-HNG architecture is similar for any G/any RAT.

In some cases herein, a CWS is identified as a mobile CWS or mobile eNodeB. This is intended to reflect, in some embodiments, a base station that is configurable to be used in more than one physical location and/or a base station that is configurable to be used while in motion and/or a base station that is configurable to be used based from a vehicle.

The impact on the following SON features should be considered: PCI planning/allocation, PCI detection and resolution; DL Reference Tx Power management; Neighbor Management; Manual NRT (neighbor relations table); X2 based ANR (automatic neighbor relations); UE learned ANR through ECGI Resolution Procedure.; Geo-location based Neighbor Relations; Dynamic/Static eNodeB Configuration; TAC allocation.

In the Public Safety deployment architecture, in some embodiments, eNodeB and backhaul modules can be load balanced across multiple HNG servers. As a result, an eNodeB does not have any affinity to an HNG or an HNG site and may attach to any available HNG. This approach allows for distribution of HNGs across multiple sites. But it introduces a challenge of coordinating SON between eNodeB located on different HNGs, as well as the need for dynamic configuration generation for eNodeB as they may change HNG while moving or when they get disconnected and reconnected.

In some embodiments, as eNodeB connect to HNGs, HNG allocates template-based configuration to each node to assure their proper behavior when providing LTE service especially when an eNodeB is deployed together with other mobile eNodeB units. The unique template-based configuration of eNodeBs can be achieved by pre-provisioning unique resources such as unique PCI pools on each HNG to eliminate PCI conflicts, in some embodiments.

For example, HNG cluster deployment supports dynamic PCI allocation based on pre-configured PCI pool. When an eNodeB connects to an HNG, it is configured with a PCI that is unique with the CWS neighbors even if CWS neighbors are attached to other HNG cluster. This is accomplished by allocating a unique PCI pool to each HNG in the network. It shall be possible to override dynamic PCI via static CLI configuration for a cell.

In some embodiments, dynamic configuration shall allow TAC allocation to each eNodeB that is connecting to the HNG. HNG shall maintain a pool of TACs and allocate it in some manner, e.g., round-robin, while optimizing paging. It shall be possible to override dynamic TAC via static CLI configuration for a cell.

Reference Tx Power management is critical for the mobile eNodeB devices to offer services with maximum coverage area and with minimum interference from other devices. In some embodiments, for public safety deployments, Reference Tx Power settings can be limited to high Reference Tx Power or low Reference Tx Power settings. Reference Tx Power management also can use a knowledge of location for each eNodeB to know a relative location between units and how their individual configuration may impact neighboring cells. Reference Tx Power management uses pre-configuration overlap factor in determining whether to set the eNodeB's Reference Tx Power to high or low level. It shall be possible to override dynamic power via static CLI configuration.

Further, in some embodiments, such as in a HNG cluster deployment, eNodeBs are distributed across multiple HNGs. Coordination between HNGs is used to identify neighboring cells and determine power level adjustments necessary based on arrival and departure of individual devices. Neighbors shall be generated via X2 communications with other cells, including macro cells as well as CWSes; UE measurements (e.g., UE measurement reports); GPS location of the mobile base station; and/or a combination thereof. It shall be possible to override the learned neighbors via CLI configuration.

An example use case is shown in FIG. 1, which shows a vehicle having an in-vehicle eNodeB 100. In-vehicle eNodeB 100 is in wireless communication with macro eNodeB 101, which is in communication with macro EPC 102. Macro EPC 102 is in communication with HNG 103.

A vehicle with an in-vehicle eNodeB 100 arrives on the scene and the vehicle's operator enables LTE Time Division Duplex (TDD). In this example a GPS signal is present for the vehicle or base station, a PCI is allocated based on geo-location configuration, an ANR NR-Empty, a TAC is allocated based on TAC-POOL associated with Virtual eNodeB (veNodeB)-zone within a HNG, eNodeB LTE TDD is on, a reference Tx Power level is set based on geo-location eNodeB Configurations. The UE attaches to eNodeB.

Figure 2:
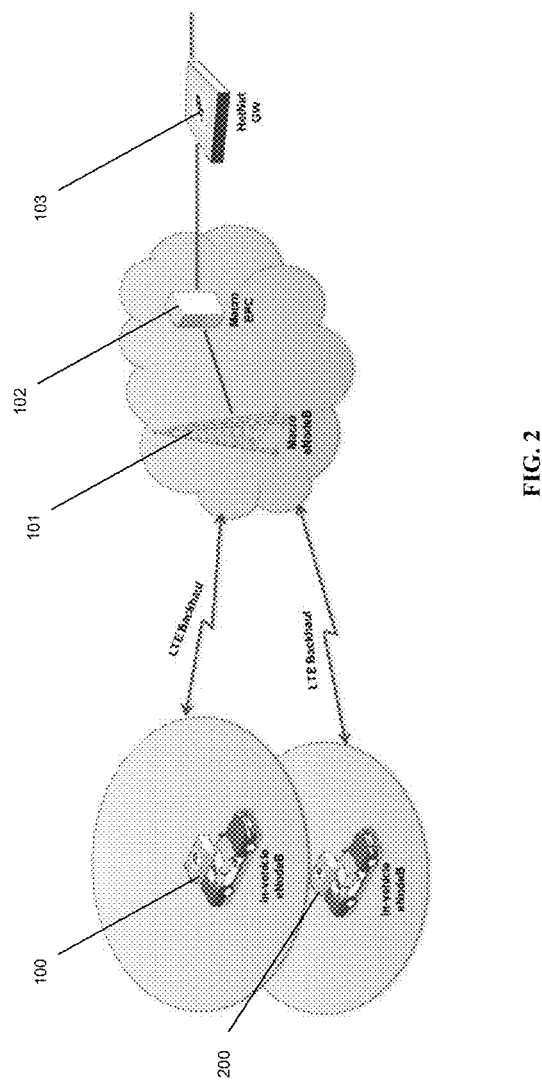
FIG. 2 is a system diagram showing components for providing a multi-HetNet Gateway (HNG) distributed Self Organizing Network (dSON), in accordance with some embodiments.

Referring now to FIG. 2, a similar scenario as FIG. 1 is shown, however a second vehicle having a second in-vehicle eNodeB 200 arrives on the scene. In-vehicle eNodeB 100 is in wireless communication with macro eNodeB 101, which is in communication with macro EPC 102. Macro EPC 102 is in communication with HNG 103. In-vehicle eNodeB 200 is also in communication with macro eNodeB 101. There is a vehicle already on the scene that has LTE TDD service enabled. The second vehicle arrives on a scene and the operator turns on LTE TDD service.

In this example, the second vehicle status includes a TAC allocated based on TAC-POOL associated with eNodeB-zone within a HNG, GPS is present, both vehicles are close by with in each other cell range and within line of sight, it is assumed the vehicles know about each other's location and they are close enough, PCI allocated based on geo-location configuration.

Based on geo-location/GPS coordinated reported by second eNodeB the following scenarios are possible. A first scenario is when, based on geo-location and coverage calculation, there is more overlapping region than configured/permissible in the HNG CLI. eNodeB-1/Vehicle-1 will keep transmitted with Full Reference Tx Power. eNodeB-2/Vehicle-2 will lower down the transmit power to a minimum.

A second scenario is when, based on geo-location and coverage calculation, there is less overlapping region than configured/permissible in the HNG CLI. eNodeB-1/Vehicle-1 will keep transmitted with Full Reference Tx Power. eNodeB-2/Vehicle-2 will bring the CELL Up with reduced Tx power.

A third scenario is when, based on geo-location and coverage calculation, there is no overlapping region. eNodeB-1/Vehicle-1 will be transmitted with Reference Tx Power. eNodeB-2/Vehicle-2 will be transmitted with Reference Tx Power. If both eNodeB-1 and eNodeB-2 are non-overlapping because of geo-location algorithm, but due to UE based Neighbor learning, eNodeB-1 detects eNodeB-2 as neighbors, it can result in following: it might possible that PCI Conflicts/PCI Confusion occurs in this situation then, PCI resolution can impact service due to PCI Resolution. Due to neighbor learning to each other, there will be no action from DL Reference Tx Power Algorithm in this case.

Still referring to FIG. 2, a scenario may occur wherein one of the vehicles leaves the scene. Two vehicles are present on the scene, and one of them starts moving. The following scenarios are possible. In a first scenario, based on geo-location and coverage calculation, there is more overlapping region than configured/permissible in the HNG CLI.

eNodeB-1/Vehicle-1 will keep transmitted with full Reference Tx Power. eNodeB-2/Vehicle-2 will lower down the transmit power to a minimum. When eNodeB-1/Vehicle-1 is the vehicle that started moving, then eNodeB-1/Vehicle-1 will be admin state down and eNodeB-2 will bring to in-service with full Reference Tx Power. When eNodeB-2/Vehicle-2 is the vehicle that started moving, then eNodeB-1/Vehicle-1 will be transmitted as it is.

In a second scenario, based on geo-location and coverage calculation, there is less overlapping region than configured/permissible in the HNG CLI. eNodeB-1/Vehicle-1 will keep transmitted with Full Reference Tx Power. eNodeB-2/Vehicle-2 will bring the cell up with reduced Tx power. When eNodeB-1/Vehicle-1 is the vehicle that started moving, then eNodeB-1/Vehicle-1 will be admin state down and eNodeB-2/Vehicle-2 will be running DL Reference Tx Power algorithm to increase the transmit power to maximum. When eNodeB-2/Vehicle-2 is the vehicle that started moving, then eNodeB-2/Vehicle-2 will be admin state down and eNodeB-1/Vehicle-1 will be running with Full Reference Tx Power.

In a third scenario, based on geo-location and coverage calculation, there is no overlapping region. eNodeB-1/Vehicle-1 will be transmitted with Reference Tx Power. eNodeB-2/Vehicle-2 will be transmitted with Reference Tx Power. When eNodeB-1/Vehicle-1 is the vehicle that started moving then eNodeB-1/Vehicle-1 will be admin state down and eNodeB-2/Vehicle-2 will be transmitted as it is. When eNodeB-2/Vehicle-2 is the vehicle that started moving then eNodeB-2/Vehicle-2 will be admin state down and eNodeB-1/Vehicle-1 will be transmitted as it is.

Geo-location and coverage calculation can be performed at the HNG, in some embodiments. All the information needed to perform this calculation is available at the HNG from the CWS.

Figure 3:
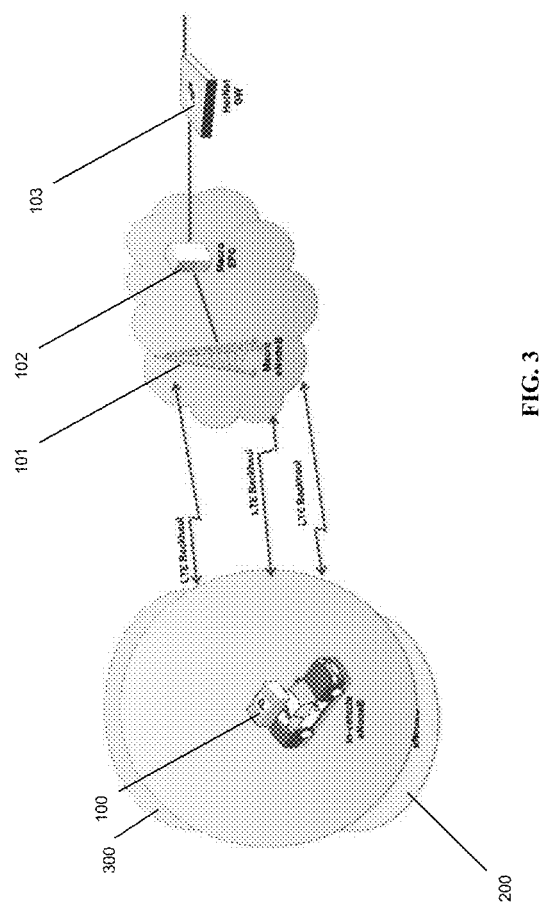
FIG. 3 is a system diagram showing components for providing a multi-HetNet Gateway (HNG) distributed Self Organizing Network (dSON), in accordance with some embodiments.

Referring to FIG. 3, another scenario may occur wherein there are multiple vehicles are on the scene located close to each other. In-vehicle eNodeB 100 is in wireless communication with macro eNodeB 101, which is in communication with macro EPC 102. Macro EPC 102 is in communication with HNG 103. In-vehicle eNodeB 200 and in-vehicle eNodeB 300 are also in communication with macro eNodeB 101.

As subsequent vehicles arrive, Reference Tx Power status for each vehicle must be re-evaluated. In this example, vehicles are closely co-located and their Reference Tx Power should be turned off as long as the configured overlap conditions are met. These calculations can be performed at the HNG.

During multiple eNodeB scenario more than two in-vehicle eNodeBs are present, the decision making regarding configuration parameters will be executed as it in terms of SON algorithms.

The inventors have contemplated that a single CWS shall be managed by a single HNG, and that multiple HNGs in a cluster shall each manage its own set of CWSes. (This does not apply in the case of replication and failover of a single HNG to another replica HNG, which requires that the backup/failover HNG take over management of the same set of CWSes as the master HNG.)

In some embodiments, multiple HNG clusters can coordinate to provide SON, e.g., distributed SON (dSON).

The Following algorithm shows how initial ANR building and PCI allocation. There is no synchronization event needed for this call flow.

CWS 1 connects to SON 1 instance;

SON 1 instance would get possible neighbor list (based on geo-location) from all other SON instances. It would use the ServiceBus: Messaging Service to reach all other SON instances;

SON 1 instance would start a timer to get responses from other SON instances. Also, if all the SON instances respond back it would stop the timer and start with the handling procedures;

SON instances where geo location based neighbors are found would return the list as possible neighbors based on geo-location list;

SON instances wherein the neighbors are not identified would not respond to the connection request. In this example, HNG3:SonMgr3 has no association with CWS 1 and CWS 2 and hence it would not respond;

After timer expiry on SON 1 instance, SON 1 instance would proceed with ANR table building and PCI allocation;

As PCI are partitioned per HNG instance, all the SON 1 instances would allocate PCI simultaneously;

Once PCI is allocated SON 1 instance would publish ANR table changes and PCI allocation to all other SON instances.

In some embodiments, during a multiple eNodeB scenario, there is possibility of a scenario where two CWS are trying to get admitted on different cluster of HNG, both are getting admitted simultaneously to different HNG Clusters, and both CWS are in an in-transition state at their respective HNGs, then a query of asking geo-located CWS may fail because both CWS are in-transition for admission in HNG. These kinds of race conditions can be properly handled at the HNG being queried, in some cases in communication with the other HNG, either by auditing procedure or a synchronization procedure as known in the art. Detection of a neighbor in a later stage can result in PCI Conflicts/Confusion and impact on Reference Tx Power Adjustment across eNodeB. Neighbor information, PCI information, TAC information, geo-location information, CWS Tx power information, etc. can be synchronized across all HNGs in the cluster, in some embodiments, enabling real-time dSON incorporating information from CWSes that are managed by another HNG in the cluster.

In some embodiments, at least the following several events may use distributed SON (dSON) algorithms. One event is CWS initial connect. During the initial connection of a CWS, the following dSON algorithms will be invoked to take a decision: PCI Allocation based on geo-location or already present manual neighbor; reference Tx power algorithm based on geo-location; based on geo-location, a new neighbor relation will be created. These steps may be performed in any order.

Another event is any and all events causing cell transition from out-of-service to in-service/admit state event from down to up for in-active CWS. During the in-active CWS (Admin State is already down), where one HNG decides to bring that CWS up, the following dSON algorithm will be invoked to take a decision: PCI conflicts/confusion/resolution, based on geo-location; Reference Tx power algorithm will be in action; and based on geo-location, a new Neighbor Relation will be created. These steps may be performed in any order.

Another event is any and all events causing cell transition from in-service to out-of-service/admit state event from up to down for active CWS. During the active CWS (Admin State is already UP), if one HNG decides to bring down that CWS, the following dSON algorithm will be invoked to take a decision: Based on geo-location, Reference Tx power algorithm will be in action; based on geo-location, a new Neighbor Relation shall be deleted. These steps may be performed in any order. This information can be propagated through the cluster.

Another event is the manual addition of neighbors. During manual neighbor additions, the following dSON algorithms will be invoked to take a decision. PCI Conflicts/Confusion/Resolution, a new Neighbor Relation will be created for CWS; Reference Tx power algorithm will be in action, based on geo-location. This information can be propagated through the cluster.

Another event is UE based neighbor relation/X2 based neighbor relation/dynamic neighbor relation. During dynamic neighbor additions, following dSON algorithm will be invoked to take a decision: PCI conflicts/confusion/resolution, a new Neighbor Relation shall be created for CWS; and Reference Tx power algorithm will be in action, based on geo-location. This information can be propagated through the cluster.

Distributed SON Configuration and PCI Allocation/Conflicts/Resolution. The solution may support the connection of an eNodeB to any of available HNGs in an HNG Cluster decided by Load balancer across the data centers. The eNodeB configuration to bring up LTE service activation in HNG Cluster environment may be the same as it was supported in the single HNG configuration. HNG Cluster may support the dynamic configuration support for CWS as defined for a single HNG. HNG Cluster deployment may be able to provide the same dSON capabilities as a single HNG deployment. These include PCI planning and conflict resolution, TAC allocation, Reference Tx Power control, eNodeB configuration, and services.

HNG Cluster may dynamically allocate PCI to an eNodeB during initial connection procedure, in some embodiments. The PCI may be allocated from the HNG's locally configured PCI pool or PCI pools. The PCI allocation may follow already existing rules for PCI conflict resolution. HNG Cluster may support all use cases defined above for PCI Allocation/Conflict detection and Resolutions.

In some embodiments, after Reboot of an eNodeB, new HNG selected shall be the same as previous one. If the eNodeB comes back within the Ageing Timer (CLI Configurable, default value is 31 minutes), some part of earlier generated configuration will be given to the eNodeB.

HNG Cluster may support all use cases defined earlier for Neighbor Relationship management, in some embodiments. HNG Cluster may support UE based neighbor learning, X2 based neighbor learning, manual neighbor management, and geo-location-based neighbor management, procedurally same as it was supported in the single HNG configuration. In HNG Cluster deployment neighbor relationships may be tracked for each cell across all HNG instances.

The same dynamic TAC allocation mechanism that is available for dynamically configured eNodeB may be available for manually configured eNodeB devices. When an eNodeB establishes a connection to an HNG, HNG may allocate to an eNodeB a TAC from the pre-configured TAC pool configured in the vENodeB-zone (virtual eNodeB zone—a zone of eNodeBs managed by that HNG). eNodeB associated with the same veNodeB may have TAC values allocated from the same TAC pool. HNG cluster may be possible to specify TAC pool as a list of TACs, range or TACs, or combination of ranges and individual TACs.

DL Reference Tx Power management is a mechanism that helps to achieve maximum LTE TDD service coverage and at the same time minimize interference between eNodeB devices.

HNG Cluster may support DL Reference Tx Power level of an eNodeB and it will be calculated based on the eNodeB location and location of neighboring activated eNodeB devices. HNG Cluster may support all use cases defined above for DL Reference Tx Power control algorithm. The eNodeB DL Reference Tx Power level configuration may be changed without requiring an eNodeB restart. The DL Reference Tx Power control algorithm may be able to evaluate up to 32 closest neighboring eNodeB nodes.

It is assumed that each HNG is configured with non-overlapping PCI pool and that each HNG is configured with a unique set of TACs, in some embodiments.

The following SON features will continue to maintain the same capabilities in HNG Cluster deployment as with a single HNG deployment, in some embodiments. These include PCI planning and conflict resolution, X2 Base ANR and manual neighbor relation provisioning will be available.

eNodeB configuration changes triggered by dSON shall not require the eNodeB restart. The same Alarms/Counter will be supported for multi-HNG as supported in single HNG for SON algorithms.

PCI Resolution impact LTE services and consequently needs cell restart procedure. In some embodiments, in case an inter-data center link is down, the eNodeB SON algorithm will assume/get the information from the current data center only. The other data center is not considered for SON algorithms. As well, in some embodiments, prior to turning off eNodeB service, it is desirable to re-direct UEs to another available eNodeB or to provider's Macro. HNG will support configuration of unique root sequence Index as well as SON functionality.

Figure 4:
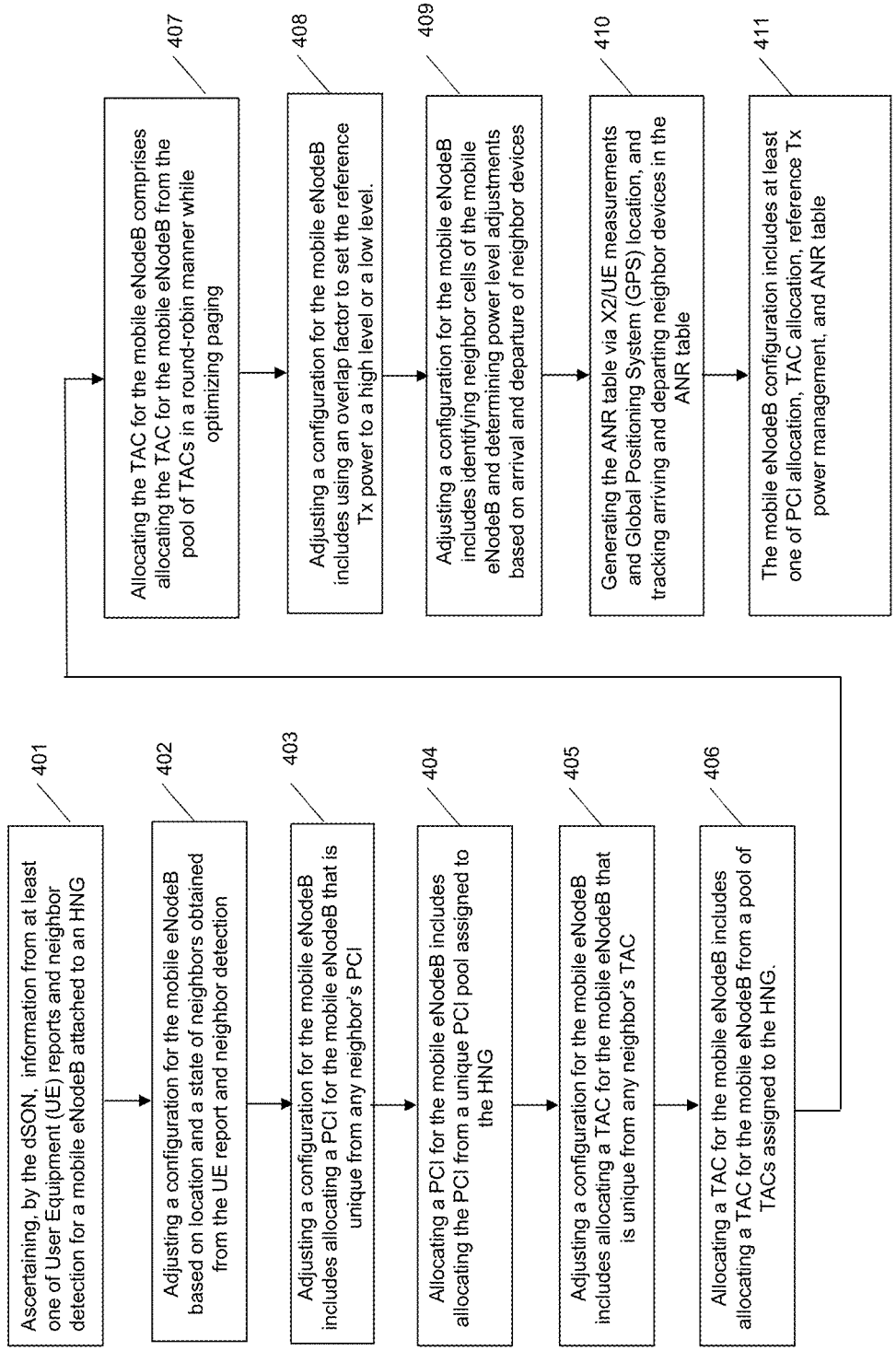
FIG. 4 is a flowchart of a method for providing a multi-HetNet Gateway distributed Self Organizing Network, in accordance with some embodiments.

Referring now to FIG. 4, an example embodiment of a method 400 for providing a multi-HNG distributed SON is shown. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order. Not all steps are required to be performed in every embodiment; rather, the flow diagram depicts an exemplary scenario in which all steps are performed.

Method 400 begins with processing block 401 which shows ascertaining, by the dSON, information from at least one of User Equipment (UE) reports and neighbor detection for a mobile eNodeB attached to an HNG. Processing block 402 recites adjusting a configuration for the mobile eNodeB based on location and a state of neighbors obtained from the UE report and neighbor detection;

As shown in processing block 403, adjusting a configuration for the mobile eNodeB includes allocating a PCI for the mobile eNodeB that is unique from any neighbor's PCI. Processing block 404 discloses wherein the allocating a PCI for the mobile eNodeB includes allocating the PCI from a unique PCI pool assigned to the HNG.

Processing block 405 recites adjusting a configuration for the mobile eNodeB includes allocating a TAC for the mobile eNodeB that is unique from any neighbor's TAC. As shown in processing block 406, allocating a TAC for the mobile eNodeB includes allocating a TAC for the mobile eNodeB from a pool of TACs assigned to the HNG. As further shown in processing block 407, allocating the TAC for the mobile eNodeB comprises allocating the TAC for the mobile eNodeB from the pool of TACs in a round-robin manner while optimizing paging.

Processing continues with processing block 408 which discloses adjusting a configuration for the mobile eNodeB includes using an overlap factor to set the reference Tx power to a high level or a low level. Processing block 409 shows adjusting a configuration for the mobile eNodeB includes identifying neighbor cells of the mobile eNodeB and determining power level adjustments based on arrival and departure of neighbor devices.

Processing block 410 recites generating the ANR table via X2/UE measurements and Global Positioning System (GPS) location, and tracking arriving and departing neighbor devices in the ANR table.

Processing block 411 discloses wherein the mobile eNodeB configuration includes at least one of PCI allocation, TAC allocation, reference TXpower management, and ANR table.

Figure 5:
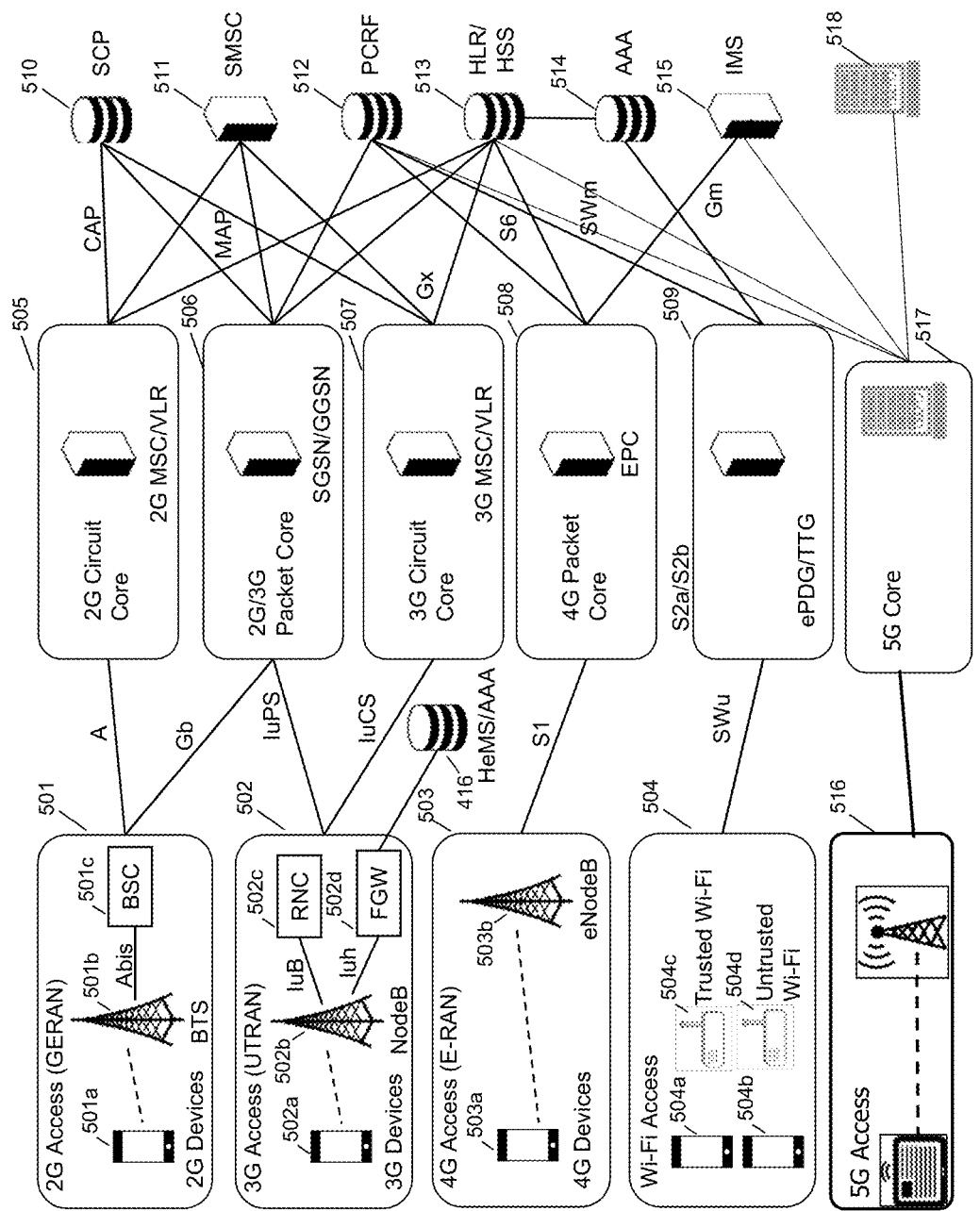
FIG. 5 is a network architecture diagram for 5G and other G networks, in accordance with some embodiments.

FIG. 5 shows is a schematic network architecture diagram for 5G and other-G prior art networks. The diagram shows a plurality of "Gs," including 2G, 3G, 4G, 5G and Wi-Fi. 2G is represented by GERAN 501, which includes a 2G device 501a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 4G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501c is required for Abis compatibility with BTS 501b, while for the 3G UTRAN, an RNC 502c is required for Iub compatibility and an FGW 502d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 6:
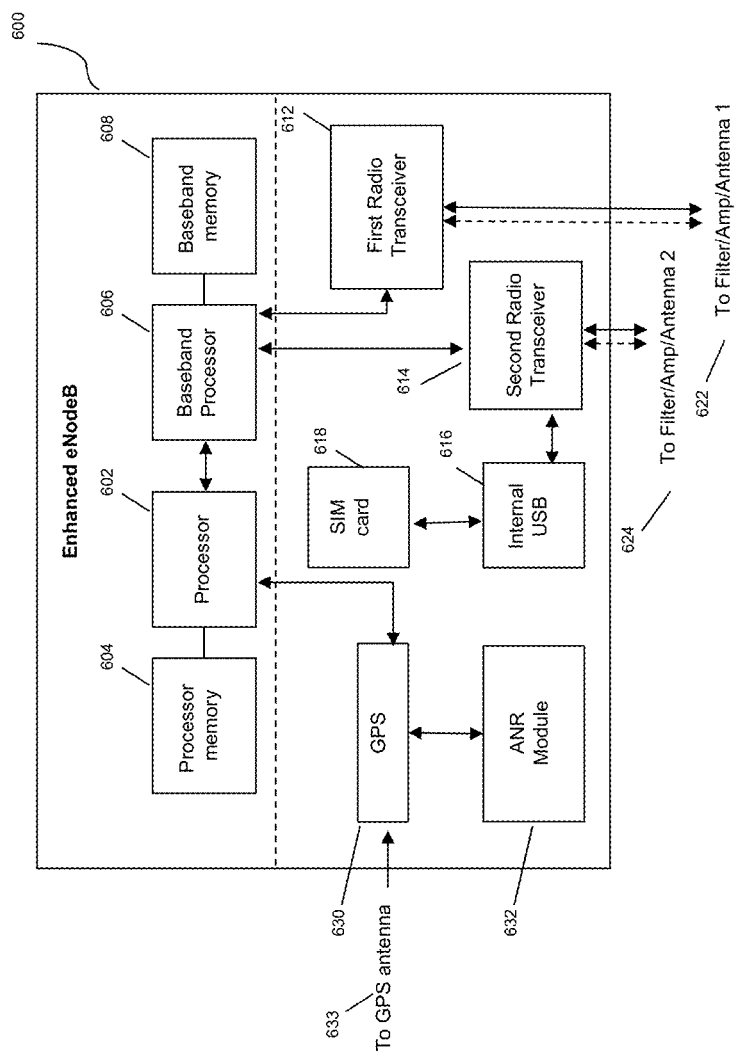
FIG. 6 is an enhanced eNodeB for performing the methods described herein, in accordance with some embodiments.

FIG. 6 is an enhanced eNodeB for performing the methods described herein, in accordance with some embodiments. Mesh network node 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality.

Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
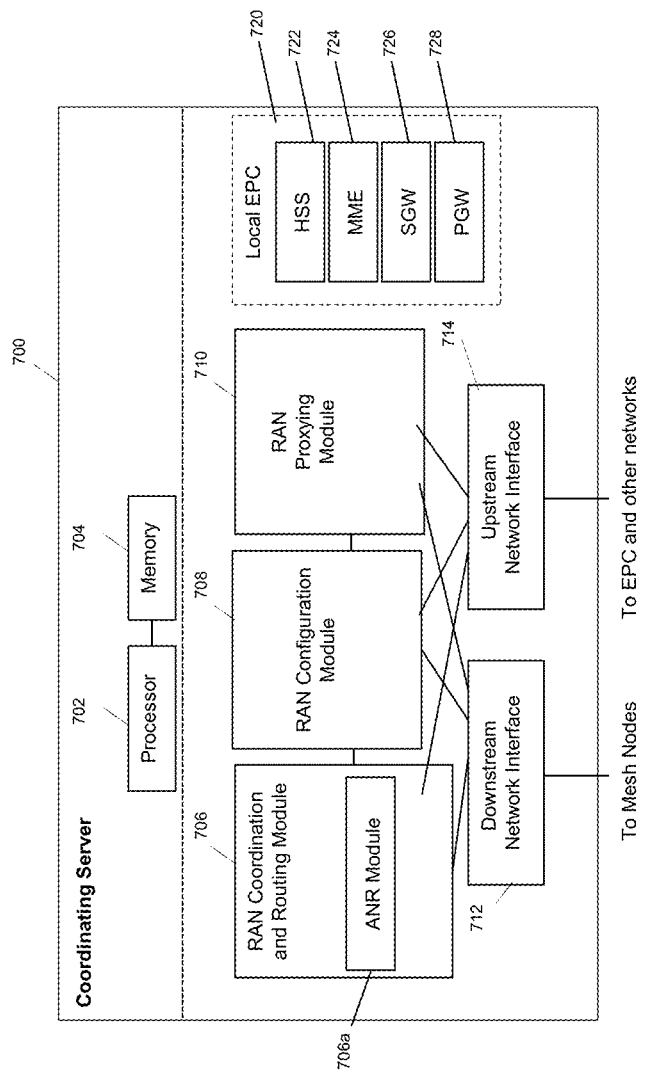
FIG. 7 is a coordinating server for providing services and performing methods as described herein, in accordance with some embodiments.

FIG. 7 is a coordinating server for providing services and performing methods as described herein, in accordance with some embodiments. Coordinating server 700 includes processor 702 and memory 704, which are configured to provide the functions described herein. Also present are radio access network coordination/routing (RAN Coordination and routing) module 706, including ANR module 706a, RAN configuration module 708, which is the SON module, and RAN proxying module 710. The ANR module 706a may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet). SON module 708 may communicate with other SON modules in other HNGs to provide the functionality described herein.

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device. Multiple coordinators 700 may run on virtual instances in a data center; on blade servers in a chassis; or on servers located at the same or different data centers, and may coordinate with each other to provide dSON as described herein. In some embodiments a dedicated inter-datacenter WAN link may be provided.

In some embodiments the SON modules 708 may coordinate using a service bus microservices architecture. The SON modules may subscribe to updates from the service bus, which may provide updates regarding, e.g., CWS TX power, ANR, etc., including from across multiple HNGs. Any data change may result in the service bus generating messaging that goes across the bus to any subscribers, thereby enabling seamless and easily-synchronized data transfer. Each SON instance would broadcast it's VENBs to all the other SON instances in the cluster whenever it comes up. As a result, every SON instance will maintain it's own copy of all the VENBs configured in the cluster. Everytime, a VENB is added/deleted to/from the HNG configuration, SON will broadcast this to all the other SON instances in the cluster. For further information regarding this architecture the reader is directed to the U.S. patent application having attorney docket no. PWS-72562US01, titled "Service Bus for Telecom Infrastructure," filed on Jul. 31, 2019, as well as U.S. Provisional Patent Application No. 62/712,968 (PWS-72562US00), both hereby incorporated by reference.

Figure 8:
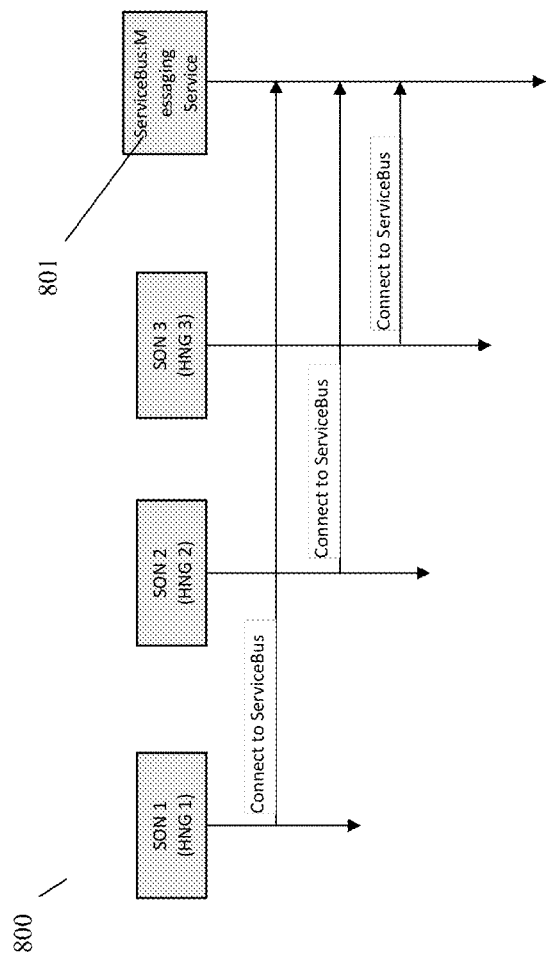
FIG. 8 is a diagram of a Service Bus interface framework, in accordance with some embodiments.

SON Instance Startup 800 is shown in FIG. 8. SON would create a connection with Service Bus 801. If this is the first time startup then any old data present on Service Bus would be cleaned up. SON instance would subscribe to required topics with Service Bus. The messaging framework would be used to subscribe the topics. On successful subscription, SonMgr would receive the ack for the subscription from the messaging framework.

Figure 9:
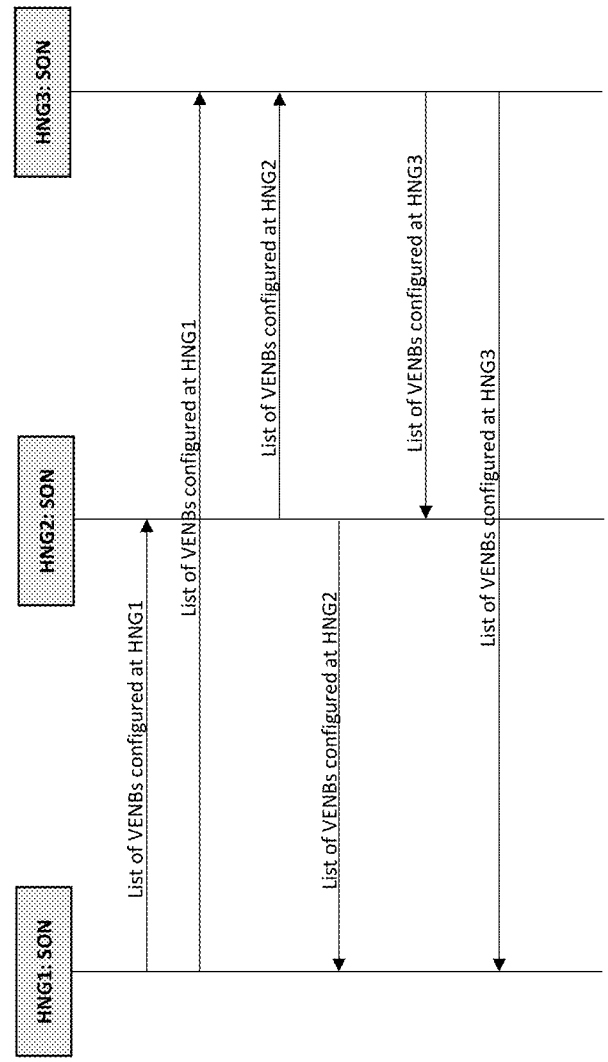
FIG. 9 is a diagram showing VENB discovery, in accordance with some embodiments.

VENB discovery 900 is shown in FIG. 9.

Each SON instance would broadcast it's VENBs to all the other SON instances in the cluster whenever it comes up. As a result, every SON instance will maintain its own copy of all the VENBs configured in the cluster. Every time, a VENB is added/deleted to/from the HNG configuration, SON will broadcast this to all the other SON instances in the cluster.

Figure 10:
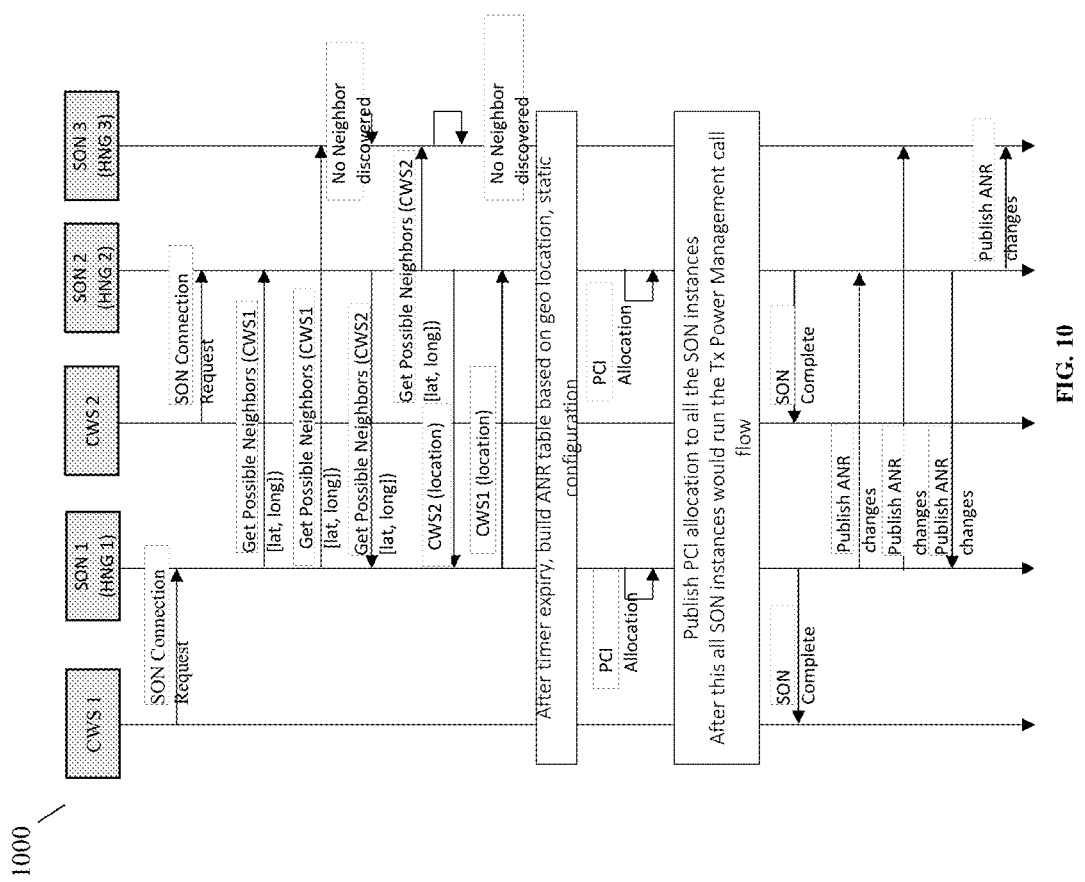
FIG. 10 is a messaging diagram showing ANR building and PCI allocation, in accordance with some embodiments.

CWS Connect and ANR Building 1000 are shown in FIG. 10. In EE PCI would be partitioned and assigned to each HNG instance. The partitions are non-overlapping.

Following algorithm shows how initial ANR building and PCI allocation. There is no synchronization event needed for this call flow. CWS 1 connects to SON 1 instance. SON 1 instance would get possible neighbor list (based on geo-location) from all other SON instances. It would use the ServiceBus: Messaging Service to reach all other SON instances. SON 1 instance would start a timer to get responses from other SON instances. Also, if all the SON instances respond back it would stop the timer and start with the handling procedures. SON instances where geo location based neighbors are found would return the list as possible neighbors based on geo-location list. SON instances wherein the neighbors are not identified would not respond to the connection request. In this example, HNG3:SonMgr3 has no association with CWS 1 and CWS 2 and hence it would not respond. After timer expiry on SON 1 instance, SON 1 instance would proceed with ANR table building and PCI allocation. As PCI are partitioned per HNG instance, all the SON 1 instances would allocate PCI simultaneously. Once PCI is allocated SON 1 instance would publish ANR table changes and PCI allocation to all other SON instances.

Figure 11:
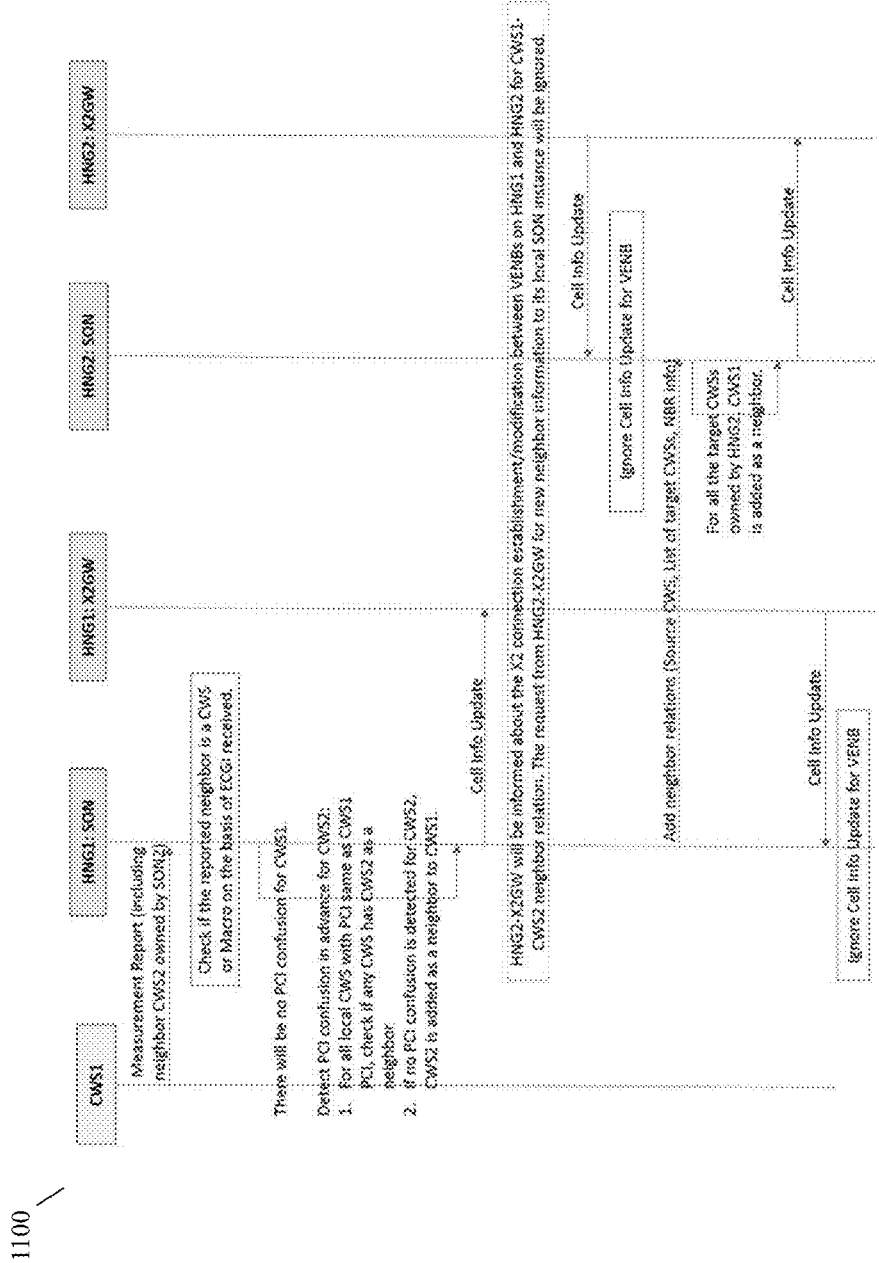
FIG. 11 is a flow diagram showing processing of UE measurement reports for new CWS neighbors, in accordance with some embodiments.

UE Measurement Report and addition of a new CWS Neighbor is shown in FIG. 11. The call flow 1100 describes the processing of UE measurement reports for new CWS neighbors addition with no PCI confusion.

Figure 12:
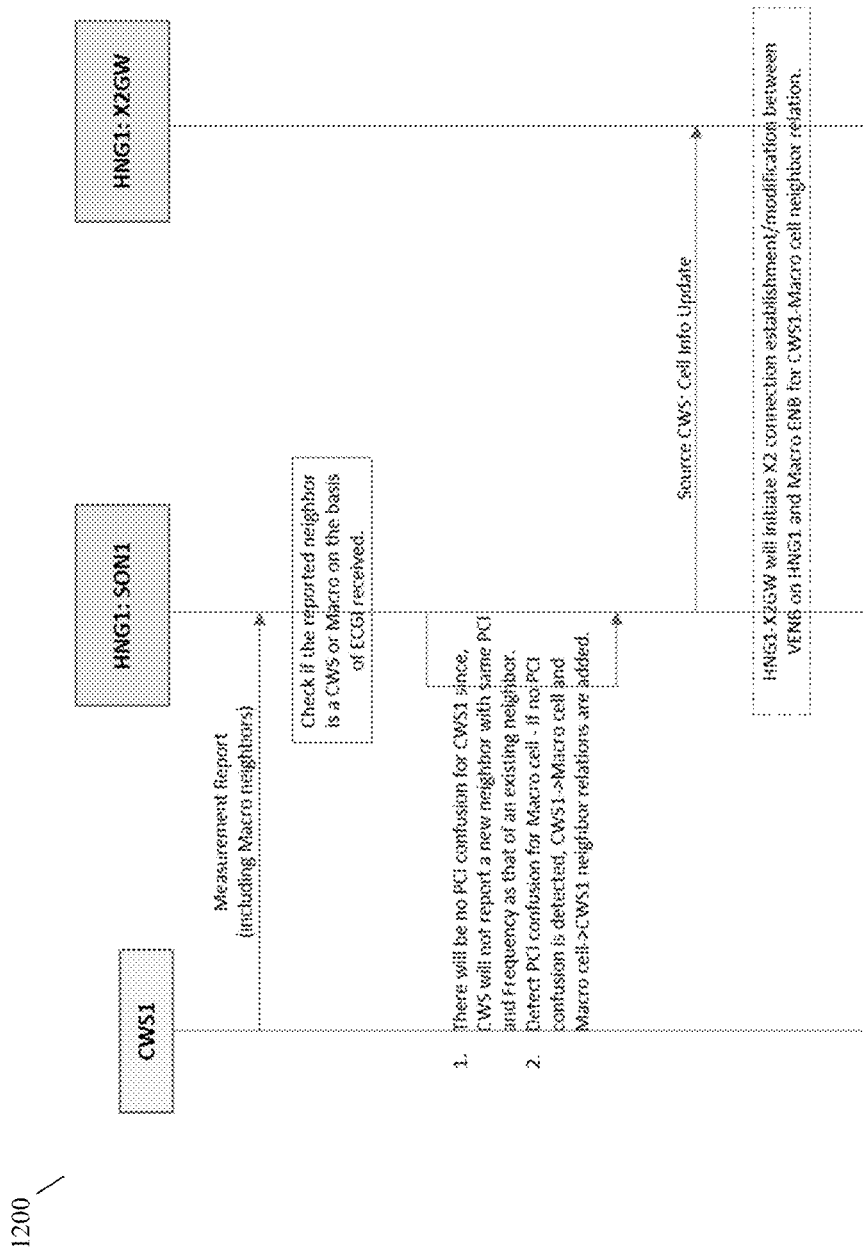
FIG. 12 is a flow diagram showing processing of UE measurement reports for new Macro neighbors, in accordance with some embodiments.

Addition of a new Macro Neighbor is shown in FIG. 12. The call flow 1200 describe the processing of UE measurement reports for new Macro neighbors addition with no PCI confusion.

Figure 13:
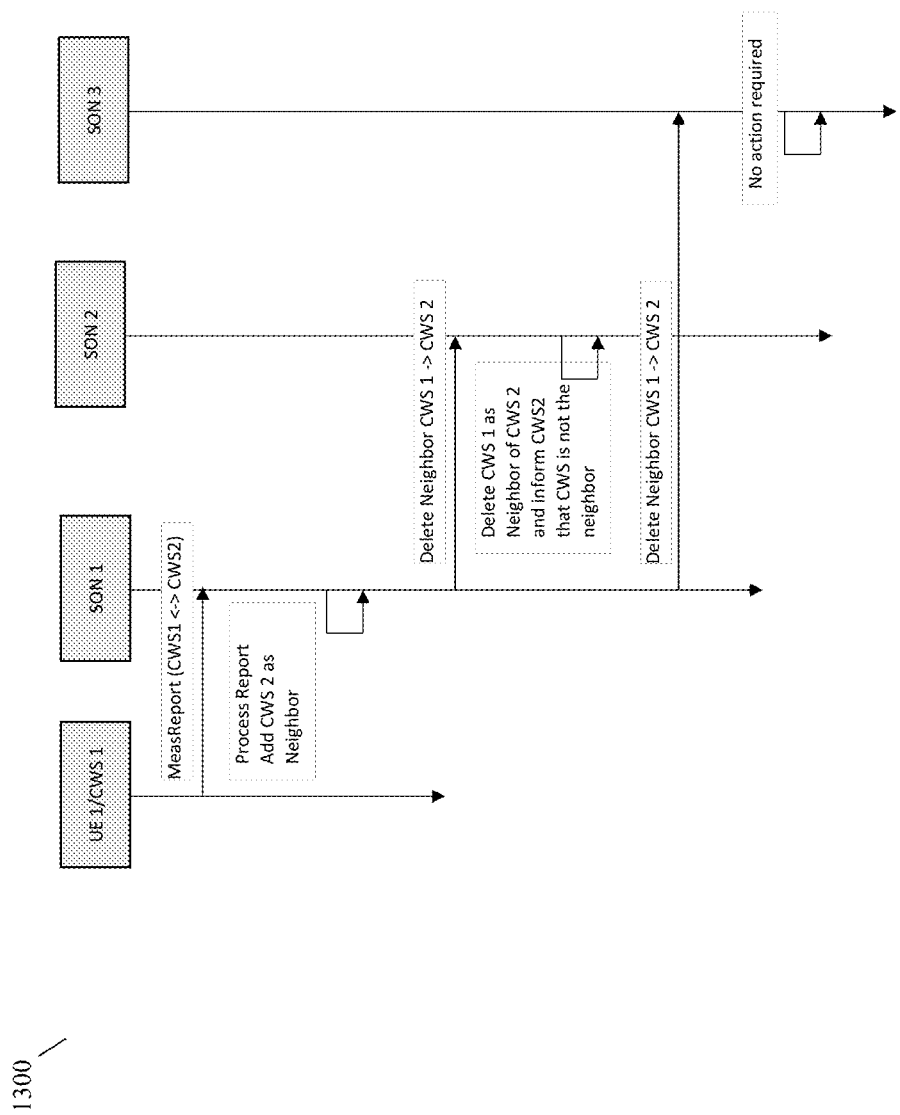
FIG. 13 is a flow diagram showing processing of UE measurement reports for deletion of a neighbor, in accordance with some embodiments.
Figure 14:
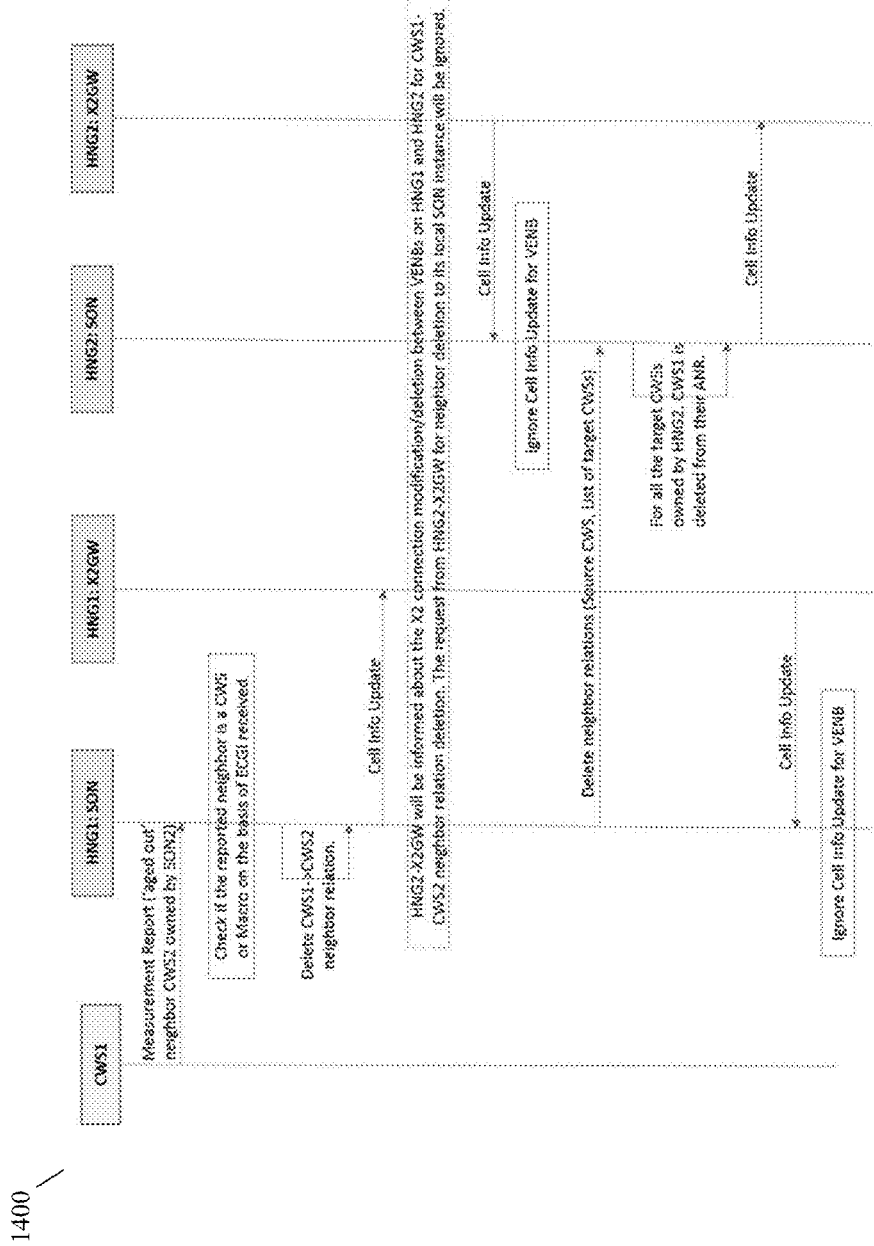
FIG. 14 is a flow diagram showing processing of UE measurement reports for deletion of a neighbor, in accordance with some embodiments.
Figure 15:
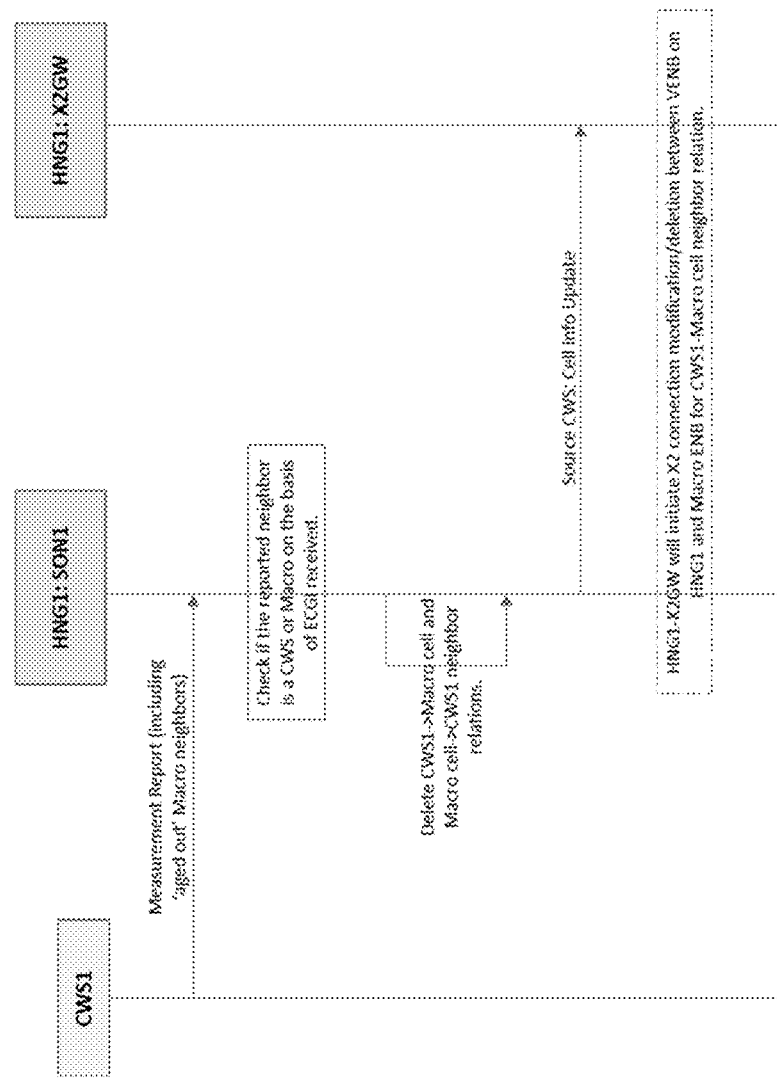
FIG. 15 is a flow diagram showing processing of UE measurement reports for aged out Macro neighbors, in accordance with some embodiments.

Deletion of a CWS Neighbor with CWS is shown in FIG. 13, FIG. 14 and FIG. 15. The call flows 1300, 1400 and 1500 when processing of UE measurement report results into deletion of neighbor. The call flow describes the processing of UE measurement reports for aged out CWS neighbors resulting into CWS neighbor deletion.

Input Triggers: UE Measurement report indicating that CWS 2 is no more neighbor. INFORM message as CWS 2 radio has been switched off. One of the CWS lost the connection and heart beat has failed to the CWS.

Deletion of a Macro Neighbor is shown in FIG. 15. The call flow 1500 describes the processing of UE measurement reports for aged out Macro neighbors resulting into Macro neighbor deletion.

Figure 16:
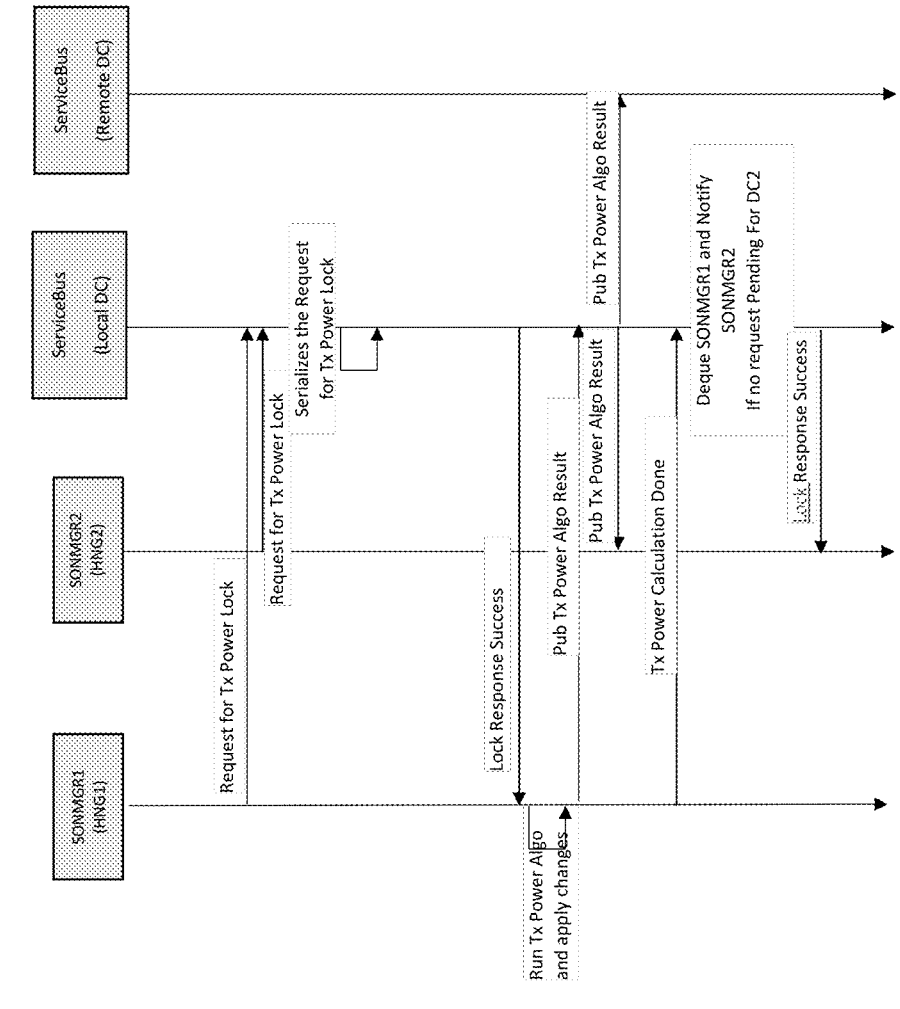
FIG. 16 is a flow diagram of a multi-HNG Tx power call flow, in accordance with some embodiments.

Multi-HNG Tx Power Call Flow 1600 is shown in FIG. 16. For Multi-HNG SONMGR case, Tx Power Algorithm shall work as below. All SONMGR Instance has ANR available with required inputs for Tx Power Algorithm. Handling of Concurrency between Multi-HNG SONMGR's shall be done in serialized manner, i.e. at a given point of time only one of the SONMGR will be running Tx Power Algorithm. Once SONMGR1Tx Power calculation is done, modified values shall be published to all SONMGR. SONMGR2 in line will be notified to start Tx Power Algorithm. For Inter-DC locking, messaging service will be used to take lock across data centers. For identifying master data center, data center tag will be used to decide priority. The TxPower Lock is released using the REST Interface whereas the Kafka TxPower updates would be published using Kafka messaging Interface. The below description is to synchronize both these interfaces such that Kafka messages with the change in TxPower is published first followed by the TxLock release.

Check out details as follows: Publish Tx power calculations first as Async Kafka producer with the Ack. The Ack would be delivered to the SonMgr once the message is successfully posted on the shared kafka topic. Once the Ack is delivered, the On Completion callback function would be called. The Ack would be received once the message is posted and even replicated to all the replica configured. SonMgr would send Tx UnLock message on OnCompletion callback function. The receiving SonMgr would clear all the messages in the queue from the time t0 it requested for the lock to the time it received the actual lock at time t1. So the delta of t1–t0 need be consumed by receiving SonMgr before making the final decision on TxPower based on marker sent via REST message. Across Data Centers, since the same shared topic is mirrored, the Publish Tx Would be ahead in the queue followed by the TxLock Request in the mirror maker queue. Batching Operation: The batch of TxPower operation happens when the lock is acquired by the SonMgr optimizing the performance.

Figure 17:
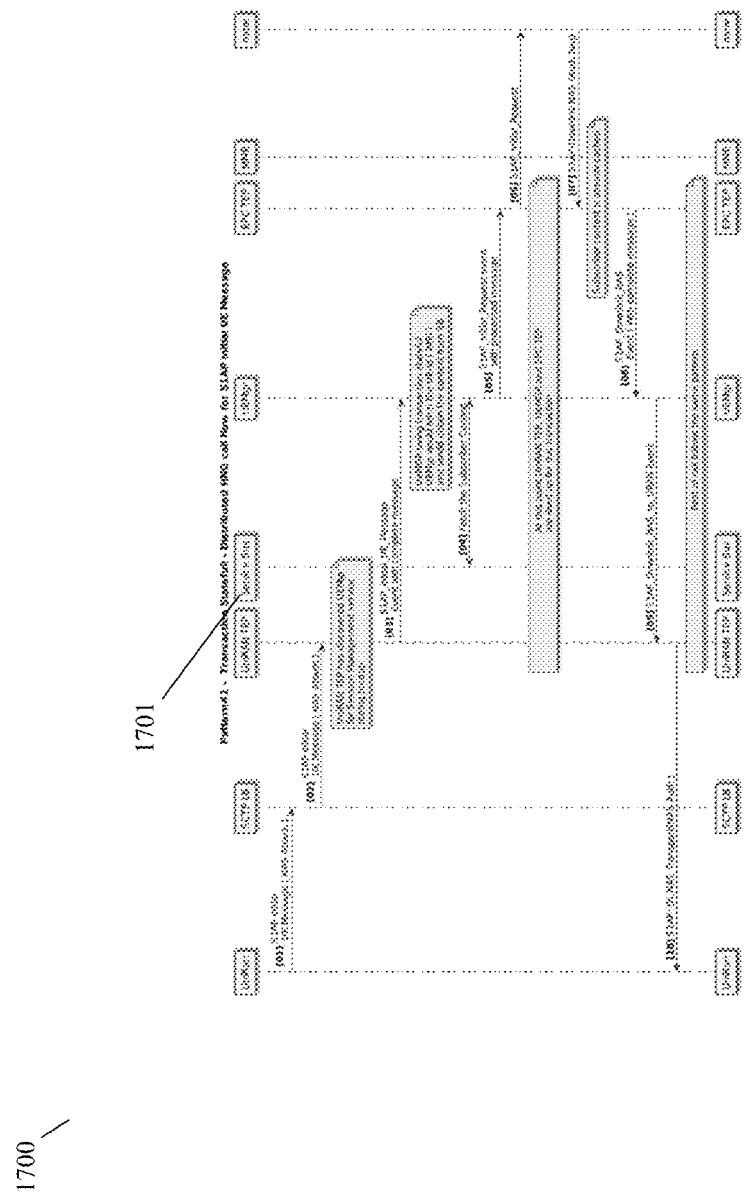
FIG. 17 is a call diagram showing distributed HNG call flow, in accordance with some embodiments.

FIG. 17 shows a first transaction stateful—distributed call flow 1800 for S1AP initial UE message including a Service Bus 1701. At [01], S1AP Initial UE message is the attach message for the UE. At [02], it is passed via an SCTP connection (could be load balanced) to a RAN terminal endpoint (TEP). TEP sends the message to an HNG that it has already discovered during bootup; at [03] it is sent to the UEMgr at the HNG. The UEMgr does not have the context for the call but fetches it from the service bus at [04], specifically, the UE ID, which can be an IMSI. Once obtained, the HNG sends the information via an S1AP Initial Request to the EPC (core) via EPC TEP at [05] via MME at HNG, to the core network MME [06]. The CN MME returns authentication requests [07], which are sent to UEMgr at [08], which then obtains the UE NAS authentication information via [09], [10]. The rest of the call follows the same pattern.

Figure 18:
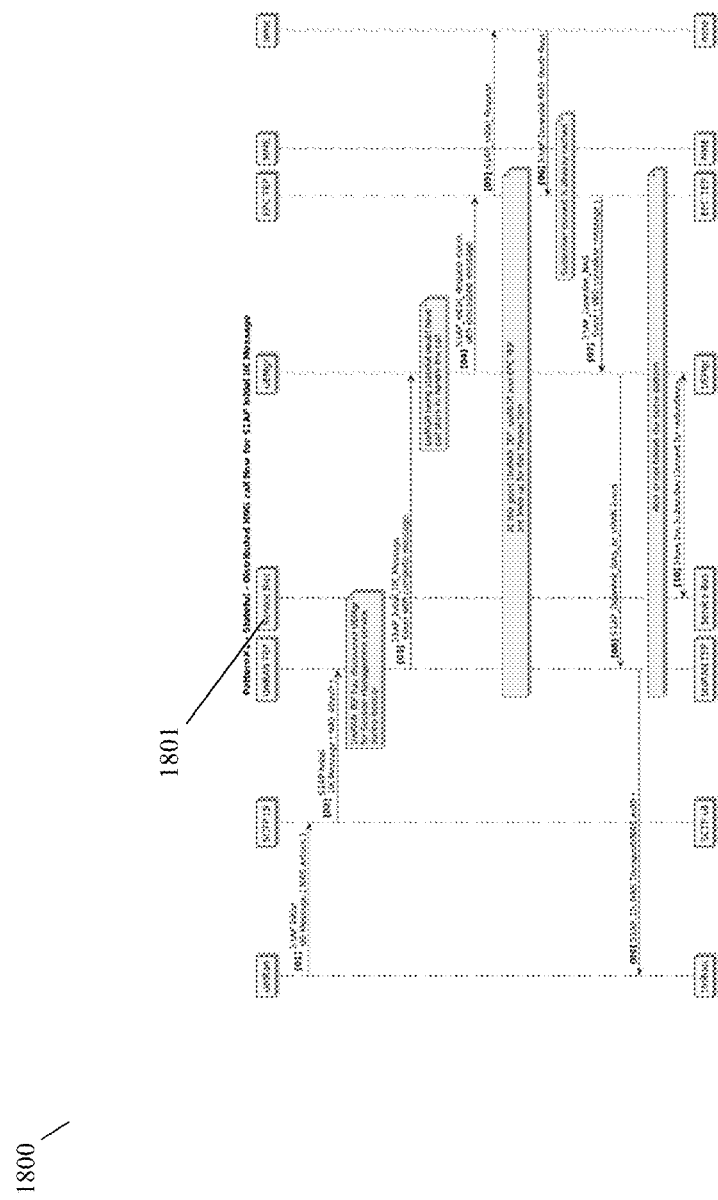
FIG. 18 is a flow diagram showing stateful distributed HNG call flow, in accordance with some embodiments.

FIG. 18 shows a stateful—distributed call flow 1800 for S1AP initial UE message including a Service Bus 1801, where state is already available on the service bus. At [01], S1AP Initial UE message is the attach message for the UE. At [02], it is passed via an SCTP connection (could be load balanced) to a RAN terminal endpoint (TEP). TEP sends the message to an HNG that it has already discovered during bootup; at [03] it is sent to the UEMgr at the HNG. The UEMgr is stateful and already has call state to handle the call. The HNG sends the information via an S1_AP_Initial Request to the EPC (core) via EPC TEP at [04] via MME at HNG, to the core network MME [05]. The CN MME returns authentication requests [06], which are sent to UEMgr at [07], which then obtains the UE NAS authentication information via [08], [09]. The rest of the call follows the same pattern. This context is stored for redundancy in/via the service bus at [10], enabling call flow 1700.

Figure 19:
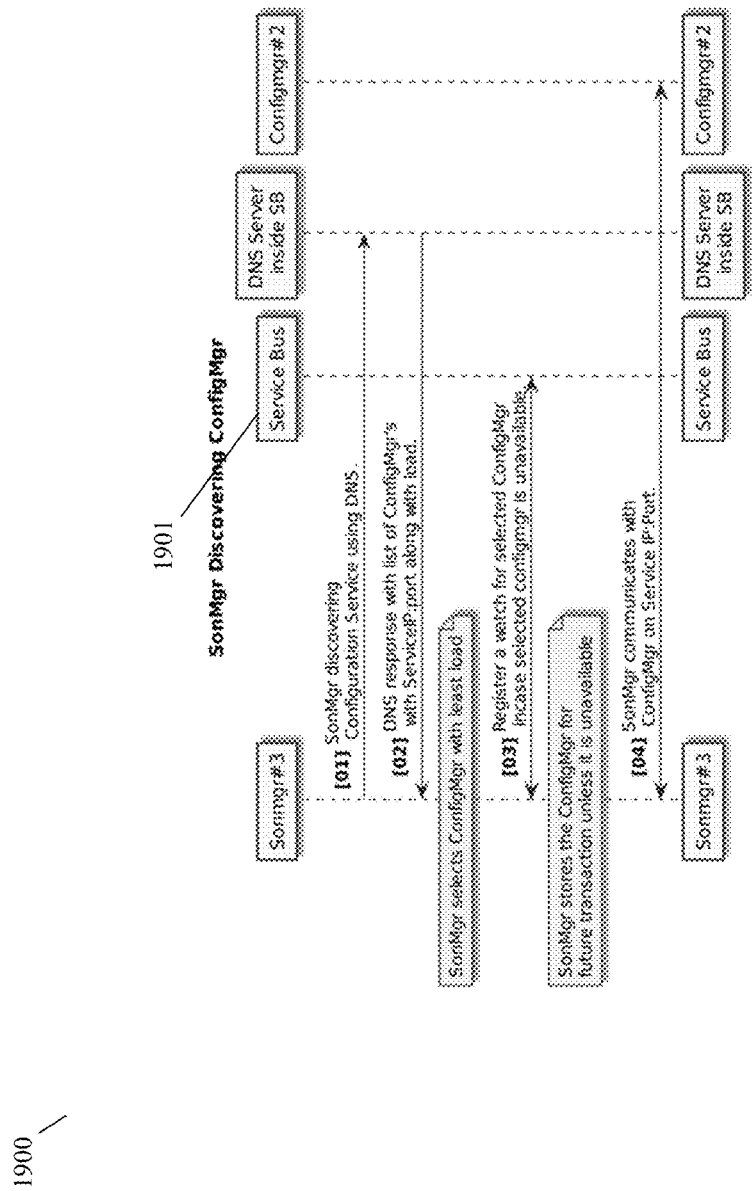
FIG. 19 is a flow diagram of a SONMgr discovering a ConfigMgr, in accordance with some embodiments.

FIG. 19 shows a call flow 1900 for SONMgr discovering ConfigMgr including Service Bus 1901. A DNS server is present within the service bus, enabling discovery by SonMgr #3 at step [01]; the DNS server returns a list of available HNGs (ConfigMgrs), including, e.g., IP, port, load information at step [02]. The SONMgr is able to select the HNG with the least load and sends a message to the service bus denoting this; this is a registration message [03], handled by the service bus; the service bus is able to deny service if unavailable to route the message or if the HNG does not respond, etc., in which case the service bus will return an error via a callback function. At step [04] the SONmgr is able to communicate directly with the selected HNG.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNodeB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNodeBs or may include regular eNodeBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNodeB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNodeB, a 5G gNB (either NR, standalone or non-standalone). The gateway described herein is understood to be suitable for providing a stateful proxy that models capabilities of dual connectivity-capable handsets for when such handsets are connected to any combination of eNodeBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G NR/SA/NSA, legacy TDD, or other air interfaces used for mobile telephony, or any combination thereof.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing a distributed Self Organizing Network (dSON) for a wireless network including at least one mobile eNodeB and a plurality of coordinating network nodes, comprising:
    ascertaining, by the dSON, information from at least one of User Equipment (UE) reports and neighbor detection for a mobile eNodeB attached to a coordinating network node;
    adjusting a configuration for the mobile eNodeB based on location and a state of neighbors obtained from a UE report and neighbor detection using a pre-configured overlap factor to set a reference Tx power to a high level or a low level,
    wherein the mobile eNodeB configuration includes at least one of Physical Cell Identification (PCI) allocation, Tracking Area Code (TAC) allocation, reference Transmit (Tx) power management, and Automatic Neighbor Relations (ANR) table;
    generating the ANR table using X2 or UE measurements and Global Positioning System (GPS) location;
    tracking arriving and departing neighbor devices in the ANR table; and
    sending an update message regarding the updated configuration for the mobile eNodeB from the coordinating network node to at least one other coordinating network node via a service bus messaging service.

2. The method of claim 1 wherein adjusting a configuration for the mobile eNodeB includes allocating a PCI for the mobile eNodeB that is unique from any neighbor's PCI.

3. The method of claim 2 wherein the allocating a PCI for the mobile eNodeB includes allocating the PCI from a unique PCI pool assigned to the HNG.

4. The method of claim 1 wherein adjusting a configuration for the mobile eNodeB includes allocating a TAC for the mobile eNodeB that is unique from any neighbor's TAC.

5. The method of claim 4 wherein the allocating a TAC for the mobile eNodeB includes allocating a TAC for the mobile eNodeB from a pool of TACs assigned to the HNG.

6. The method of claim 5 wherein allocating the TAC for the mobile eNodeB comprises allocating the TAC for the mobile eNodeB from the pool of TACs in a round-robin manner while optimizing paging.

7. The method of claim 1 wherein adjusting a configuration for the mobile eNodeB includes identifying neighbor cells of the mobile eNodeB and determining power level adjustments based on arrival and departure of neighbor devices.

8. The method of claim 1 further comprising the UE learning ANR through an E-UTRAN Cell Global Identifier (ECGI) resolution procedure.

9. A system for providing a distributed Self Organizing Network (dSON) for a wireless network, comprising:
a plurality of coordinating network nodes; and
a mobile eNodeB in wireless communication with one of the plurality of coordinating network nodes;
wherein the dSON is configured to ascertain information from at least one of User Equipment (UE) reports and neighbor detection for the mobile EnodeB attached to a coordinating network node, and adjust a configuration for the mobile eNodeB based on a location and a state of neighbors obtained from a UE report and neighbor detection using a pre-configured overlap factor to set a reference Tx power to a high level or a low level;
wherein the mobile eNodeB configuration includes at least one of Physical Cell Identification (PCI) allocation, Tracking Area Code (TAC) allocation, reference Transmit (Tx) power management, and Automatic Neighbor Relations (ANR) table;
wherein the dSON is configured to generate the ANR table using X2 or UE measurements and Global Positioning System (GPS) location and track arriving and departing neighbor devices in the ANR table; and
wherein the dSON is configured to send an update message regarding the updated configuration for the mobile eNodeB from the coordinating network node to at least one other coordinating network node via a service bus messaging service.

10. The system of claim 9 wherein the adjustment to the configuration for the mobile eNodeB includes a PCI allocated for the mobile eNodeB that is unique from any neighbor's PCI.

11. The system of claim 10 wherein the PCI allocated for the mobile eNodeB is allocated from a unique PCI pool assigned to the HNG.

12. The system of claim 9 wherein the adjustment to the configuration for the mobile eNodeB includes a TAC for the mobile eNodeB that is unique from any neighbor's TAC.

13. The system of claim 12 wherein the TAC allocated for the mobile eNodeB is allocated from a pool of TACs assigned to the HNG.

14. The system of claim 13 wherein the TAC for the mobile eNodeB is allocated from a pool of TACs in a round-robin manner while optimizing paging.

15. The system of claim 9 wherein the adjustment to the configuration for the mobile eNodeB includes identified neighbor cells of the mobile eNodeB and power level adjustments based on arrival and departure of neighbor devices.

16. The system of claim 9 wherein the UE learns ANR through an E-UTRAN Cell Global Identifier (ECGI) resolution procedure.

17. A non-transitory computer-readable medium containing instructions for providing a distributed Self Organizing Network (dSON) for a wireless network which, when executed, cause a dSON to perform steps comprising:
ascertaining, by the dSON, information from at least one of User Equipment (UE) reports and neighbor detection for a mobile EnodeB attached to a coordinating network node;
adjusting a configuration for the mobile eNodeB based on location and a state of neighbors obtained from a UE report and neighbor detection using a pre-configured overlap factor to set a reference Tx power to a high level or a low level,
wherein the mobile eNodeB configuration includes at least one of Physical Cell Identification (PCI) allocation, Tracking Area Code (TAC) allocation, reference Transmit (Tx) power management, and Automatic Neighbor Relations (ANR) table;
generating the ANR table using X2 or UE measurements and Global Positioning System (GPS) location;
tracking arriving and departing neighbor devices in the ANR table; and
sending an update message regarding the updated configuration for the mobile eNodeB from the coordinating network node to at least one other coordinating network node via a service bus messaging service.

18. The non-transitory computer-readable medium of claim 17 wherein the adjustment to the configuration for the mobile eNodeB includes a PCI allocated for the mobile eNodeB that is unique from any neighbor's PCI; a TAC for the mobile eNodeB that is unique from any neighbor's TAC; and identified neighbor cells of the mobile eNodeB and power level adjustments based on arrival and departure of neighbor devices.

19. The non-transitory computer-readable medium of claim 17 further comprising instructions wherein the UE learns ANR through an E-UTRAN Cell Global Identifier (ECGI) resolution procedure.

* * * * *